(12) United States Patent
Senthoorpandian et al.

(10) Patent No.: US 10,814,438 B2
(45) Date of Patent: Oct. 27, 2020

(54) METHOD AND ARRANGEMENT FOR REMOVING AND LIFTING A BLADE PITCH SLEWING RING BEARING OF A WIND TURBINE

(71) Applicant: WINDCARE INDIA PVT LTD, Tirupur (IN)

(72) Inventors: Anthonyraj Prem Kumar Senthoorpandian, Tirupur (IN); Kalimuthu Nagrathinam, Tirupur (IN)

(73) Assignee: WINDCARE INDIA PVT LTD, Tirupur (IN)

( * ) Notice: Subject to any disclaimer, the term of this patent is extended or adjusted under 35 U.S.C. 154(b) by 315 days.

(21) Appl. No.: 15/335,912

(22) Filed: Oct. 27, 2016

(65) Prior Publication Data

US 2017/0045030 A1 Feb. 16, 2017

Related U.S. Application Data

(63) Continuation of application No. PCT/IB2015/053139, filed on Apr. 30, 2015.

(30) Foreign Application Priority Data

Apr. 30, 2014 (IN) .......................... 2193/CHE/2014

(51) Int. Cl.
*B23P 6/00* (2006.01)
*F03D 13/10* (2016.01)

(52) U.S. Cl.
CPC .............. *B23P 6/002* (2013.01); *F03D 13/10* (2016.05); *F05B 2240/916* (2013.01); *Y02E 10/728* (2013.01)

(58) Field of Classification Search
CPC ........ B66F 11/00; F03D 1/0658; F03D 13/10; F05B 2240/916
See application file for complete search history.

(56) References Cited

U.S. PATENT DOCUMENTS 8,069,634 B2 * 12/2011 Livingston .............. F03D 13/10
52/120
8,281,546 B2 * 10/2012 Thompson .............. E04G 11/22
52/745.17

(Continued)

FOREIGN PATENT DOCUMENTS

DE       19726408 C1 *  3/1999  .............. B66F 11/04
WO  WO-2011110254 A2 *  9/2011  .............. F03D 80/50

OTHER PUBLICATIONS

Machine Translation of DE19726408C1 (Year: 1999).*

(Continued)

*Primary Examiner* — Jacob J Cigna
(74) *Attorney, Agent, or Firm* — Robert P. Michal, Esq; Carter, DeLuca & Farrell LLP

(57) ABSTRACT

A method and an arrangement for removing and lifting of a blade pitch slewing ring bearing of a wind turbine after a blade from a rotor hub of the wind turbine is removed, is disclosed. The arrangement and method enables the lowering and lifting of the wind turbine without the need of large and heavy cranes so that the replacement can be carried out cost effectively. The arrangement includes a first pulley mounted at the bottom of the wind turbine, a second pulley mounted inside a rotor hub, a lifting line running over the first pulley, the second pulley and further over a third pulley mounted inside a carrier. The carrier supports the blade pitch slewing ring bearing during lifting and lowering which is achieved through a coordinated operation of a ground winch, the lifting line and tag lines. Further, rigging equipment is attached to the lowered blade pitch slewing ring bearing to enable easy transportation.

2 Claims, 16 Drawing Sheets

(56) References Cited

U.S. PATENT DOCUMENTS

| | | | | |
|---|---|---|---|---|
| 2007/0151194 A1* | 7/2007 | Livingston | ............ | B66C 23/06 52/651.05 |
| 2007/0290426 A1* | 12/2007 | Trede | .............. | F03D 80/50 269/1 |
| 2008/0078128 A1* | 4/2008 | Livingston | ............ | F03D 13/10 52/40 |
| 2010/0135797 A1* | 6/2010 | Nies | ............. | F03D 80/50 416/9 |
| 2010/0254813 A1* | 10/2010 | Dawson | ............. | B66D 1/60 416/146 R |
| 2011/0266096 A1 | 11/2011 | Nies | | |
| 2012/0217089 A1* | 8/2012 | Fenger | ............. | F03D 80/50 182/2.1 |
| 2013/0025113 A1* | 1/2013 | Arocena De La Rua | ............. | B66C 1/62 29/525.11 |
| 2013/0318789 A1* | 12/2013 | Gabeiras | ............. | B21K 3/04 29/889.7 |
| 2014/0010658 A1* | 1/2014 | Nielsen | ............. | B66C 1/108 416/204 R |
| 2014/0360015 A1* | 12/2014 | Lohan | ............. | F03D 1/0658 29/889.1 |
| 2015/0232307 A1* | 8/2015 | Holloway | ............. | B66C 1/108 414/800 |

OTHER PUBLICATIONS

International Search Report issued by the Indian Patent Office in relation to International Application No. PCT/IB2015/053139 dated Jan. 21, 2016 (3 pages).

Written Opinion of the International Searching Authority issued by the Indian Patent Office in relation to PCT/IB2015/053139 dated Jan. 21, 2016 (4 pages).

* cited by examiner

METHOD AND ARRANGEMENT FOR REMOVING AND LIFTING A BLADE PITCH SLEWING RING BEARING OF A WIND TURBINE

CROSS-REFERENCE TO RELATED APPLICATIONS

This application is a National Phase Entry under 35 USC § 371 of PCT Patent Application Serial No. PCT/IB2015/053139 filed Apr. 30, 2015, which claims the benefit under 35 USC § 119 to Indian Patent Application No. 2193/CHE/2014, filed Apr. 30, 2014, the disclosure of each of which is expressly incorporated herein by reference.

FIELD OF THE DISCLOSURE

The present invention relates to the field of wind turbines.

BACKGROUND INFORMATION

Wind turbines require regular maintenance throughout their operational life. Maintenance of wind turbines includes removal and replacement of rotor blades, blade pitch slewing ring bearing and other equipment installed in a nacelle of a wind turbine.

Conventionally, removal and replacement of the blade pitch slewing ring bearing is accomplished with the help of large cranes. The cranes are required to carry the load of the blade pitch slewing ring bearing up to the height of the tower of a wind turbine, thereby necessitating the use of heavy and large cranes. The use of large cranes leads to a significant increase in the operation cost of the maintenance required for the wind turbine. Further, the use of large cranes poses difficulties in transporting the cranes to far flung areas, hilly terrains, rock out crops, loose soil, and agricultural land, thereby leading inconvenience in maintenance operation of wind turbines.

Hence there is a need for a method and an arrangement that alleviates the drawbacks associated with conventional methods and arrangements used for removal and replacement of a blade pitch slewing ring bearing of a wind turbine.

OBJECTS

Some of the objects of the present disclosure are aimed to ameliorate one or more problems of the prior art or to at least provide a useful alternative and are listed herein below.

An object of the present disclosure is to provide a method for removal of a blade pitch slewing ring bearing of a wind turbine; after a blade is removed from a rotor hub of the wind turbine.

Another object of the present disclosure is to provide a method that is simple.

Another object of the present disclosure is to provide an arrangement for lifting and removing of a blade pitch slewing ring bearing of a wind turbine, when a blade from a rotor hub of the wind turbine is removed.

Another object of the present disclosure is to provide an arrangement that is cost effective.

SUMMARY

In accordance with an aspect of the present disclosure, there is provided a method for removing and lifting of a blade pitch slewing ring bearing of a wind turbine; after a blade from a rotor hub of the wind turbine is removed. The method includes attaching a first pulley to a first attachment point at the bottom of the wind turbine and attaching a second pulley to a second attachment point at the rotor hub of the wind turbine. The method further includes attaching a third pulley at an operative top portion of a carrier positioned in line with the second pulley and attaching a lifting line from a ground winch over the first pulley, the second pulley and the third pulley. Furthermore, the method includes removing the blade pitch slewing ring bearing by an operation of the ground winch.

Further, the method includes positioning of a fourth pulley at an operative bottom portion of the carrier.

Typically, the step of attaching the first pulley includes the step of positioning a first jig at the bottom of the wind turbine and the step of attaching the first pulley to the first jig at the first attachment point. Further, the step of attaching a second pulley includes the steps of positioning at least one second jig inside the rotor hub of the wind turbine and attaching the second pulley to the at least one second jig at the second attachment point.

The step of removing the blade pitch slewing ring bearing includes the step of positioning the carrier proximate the blade pitch slewing ring bearing of the wind turbine, the step of fastening the carrier to a blade pitch slewing ring bearing in blade hub flange and the step of removing the bolts between the blade pitch slewing ring bearing and a hub flange of the wind turbine and further the step of lowering the blade pitch slewing ring bearing by the operation of the ground winch.

In accordance with another aspect of the present embodiment, there is provided an arrangement for lifting and removing a blade pitch slewing ring bearing of a wind turbine after a blade from a rotor hub of the wind turbine is removed. The arrangement includes a first pulley mounted at the bottom of the wind turbine and a second pulley mounted at the rotor hub of the wind turbine and positioned in line with the first pulley. Further, the arrangement includes a ground winch disposed around the wind turbine and positioned at a pre-determined distance from the first pulley, the ground winch operable for adjusting the tension of a lifting line, wherein the lifting line is connected to the ground winch from one end and extends over the first pulley and the second pulley from the other end. Furthermore, the arrangement includes a carrier configured to hold the blade pitch slewing ring bearing during lifting and lowering of the blade pitch slewing ring bearing corresponding to the tension adjustment of the lifting line by the ground winch and a third pulley mounted at an operative top portion of the carrier and operatively coupled to the lifting line extended over the second pulley.

Further, the arrangement includes at least two tag lines coupled to the carrier to provide lateral support during lifting and lowering of the blade pitch slewing ring bearing corresponding to the tension adjustment of the lifting line by the ground winch. Furthermore, the arrangement includes a fourth pulley mounted at an operative bottom portion of the carrier and a first jig mounted at the bottom of the wind turbine, wherein the first jig comprises a hook to facilitate mounting of the first pulley thereon.

Further, the arrangement includes at least one second jig mounted inside the rotor hub of the wind turbine, wherein the at least one second jig comprises at least one fastening mechanism to facilitate mounting of the second pulley on the at least one second jig. Furthermore, the arrangement includes the rigging equipment to facilitate transportation of the blade pitch slewing ring bearing being removed from the wind turbine.

Typically the carrier of the present disclosure includes a plurality of leg posts defining a closed structure thereof and a template positioned at an operative top portion of the leg posts, wherein the template is configured to hold the blade pitch slewing ring bearing during lifting and lowering thereof.

BRIEF DESCRIPTION OF THE DRAWINGS

The method and arrangement of the present disclosure will now be described with the help of the accompanying drawings, in which.

DETAILED DESCRIPTION

The method and the arrangement of the present disclosure will now be described with reference to the embodiment shown in the accompanying drawings. The embodiment does not limit the scope and ambit of the disclosure. The description relates purely to the example and preferred embodiment of the disclosed method and its suggested application.

The method and the arrangement, and the various features and advantageous details thereof are explained with reference to the non-limiting embodiments in the following description. Descriptions of well-known parameters and processing techniques are omitted so as to not unnecessarily obscure the embodiment herein. The examples used herein are intended merely to facilitate an understanding of ways in which the embodiment herein may be practiced and to further enable those of skill in the art to practice the embodiment herein. Accordingly, the examples should not be construed as limiting the scope of the embodiment herein.

The present disclosure envisages a method and an arrangement for removal and replacement of a blade pitch slewing ring bearing of a wind turbine without the need for a large expensive heavy-duty crane. The method and the arrangement of the present disclosure enable the removal and replacement of the blade pitch slewing ring bearing in an easy, safe and cost-effective manner.

Various embodiments of the present disclosure will now be explained with reference to FIG. 1 through FIG. 19 wherein the key components are referenced generally by numerals as indicated in the accompanying drawings.

Figure 1:
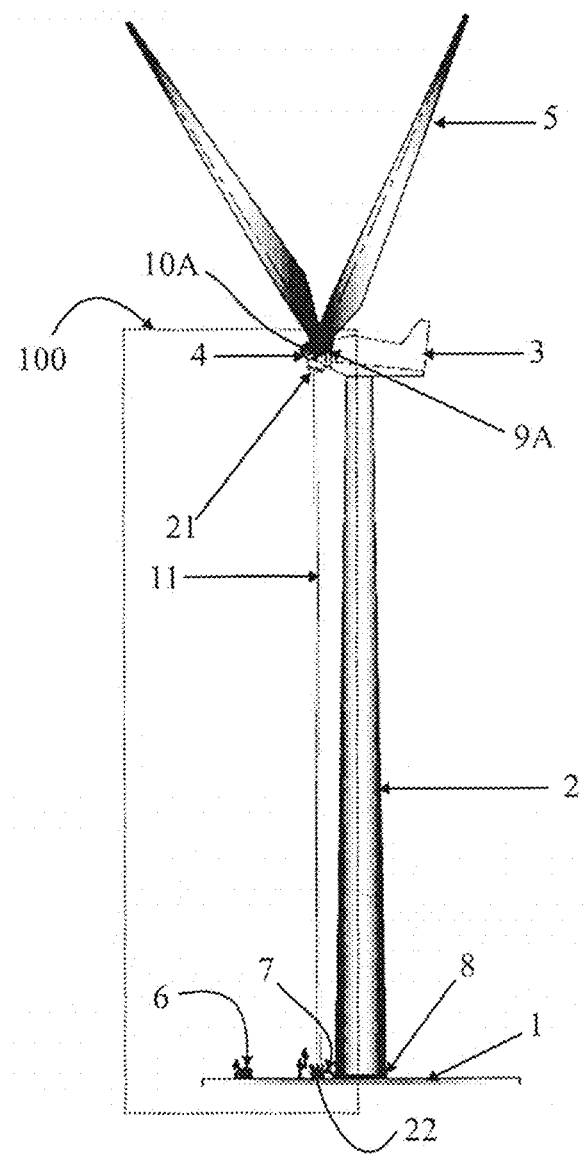
FIG. 1 illustrates an arrangement for removing and lifting a blade pitch slewing ring bearing of a wind turbine in accordance with an embodiment of the present disclosure.
Figure 12:
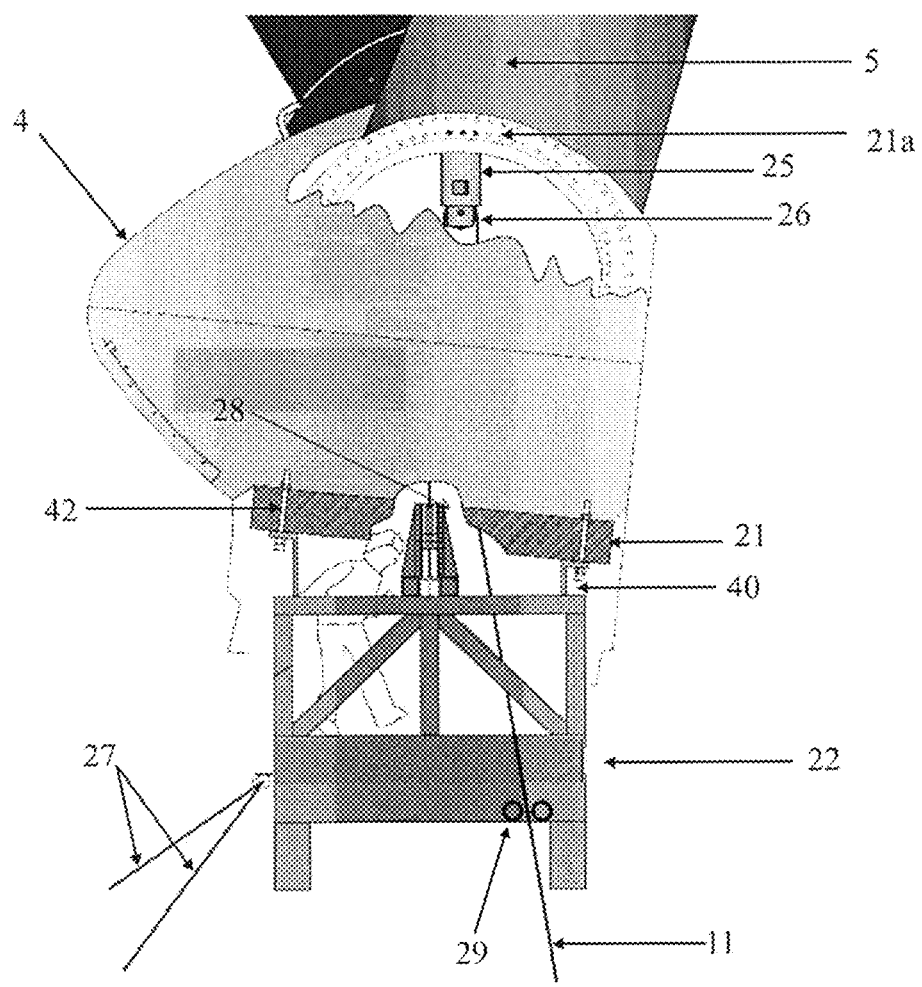
FIG. 12 illustrates the mounting of a blade pitch slewing ring bearing on a template of the carrier of the arrangement of FIG. 1.
Figures 13, 14:
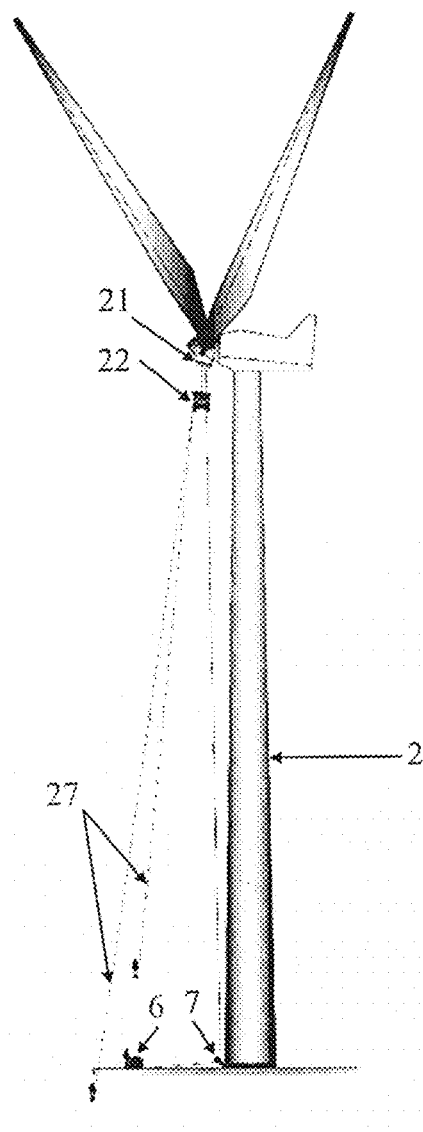
FIG. 13 illustrates the lowering of the carrier of the arrangement of FIG. 1.
FIG. 14 illustrates an enlarged view of the carrier during the lowering operation of the carrier of the arrangement of FIG. 1.
Figures 15, 16:
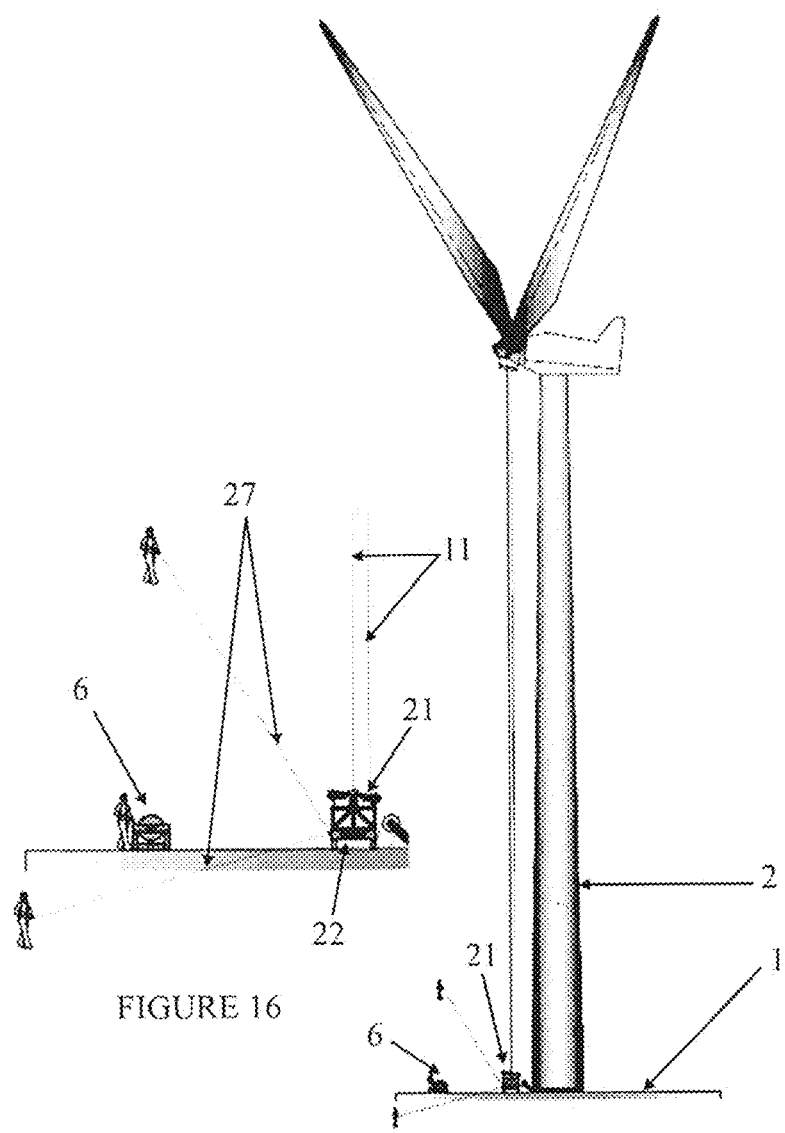
FIG. 15 illustrates the positioning of the carrier holding the blade pitch stewing ring bearing, on a foundation of the wind turbine.
FIG. 16 illustrates the enlarged view of the positioning of the carrier holding the blade pitch slewing ring bearing, on a foundation of the wind turbine.
Figure 17:
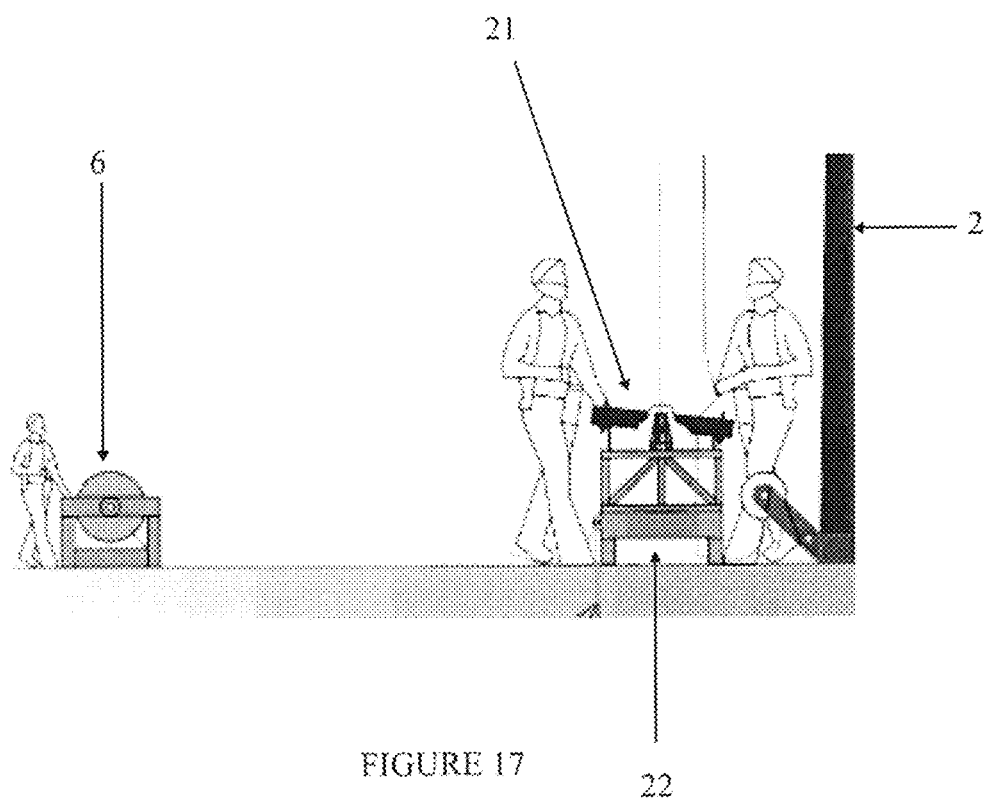
FIG. 17 illustrates the removal of the lifting line from the carrier positioned on the foundation of the wind turbine.

As illustrated in FIG. 1, the arrangement 100 of the present disclosure includes a first pulley 7, a second pulley 26 (not shown in FIG. 1), a third pulley 28 (not shown in FIG. 1), a fourth pulley 29 (as shown in FIG. 12) and a lifting line 11 provided by a ground winch 6 and passing over the first pulley 7, the second pulley 26 and further over the third pulley 28. The arrangement 100 further includes a carrier 22 that holds a blade pitch slewing ring bearing 21 during the time of lowering and lifting thereof. The arrangement 100 further includes a first jig 8 and at least one second jig 25 (not shown in FIG. 1). At the bottom of the tower 2, the first jig 8 is connected which is utilized to hold the first pulley 7 thereon with the help of a hook mounted at a first attachment point on the first jig 8. The orientation of the first attachment point is such that the first pulley 7 is in line with the location of the blade pitch slewing ring bearing being removed from the rotor hub 4 of the wind turbine.

Figure 2:
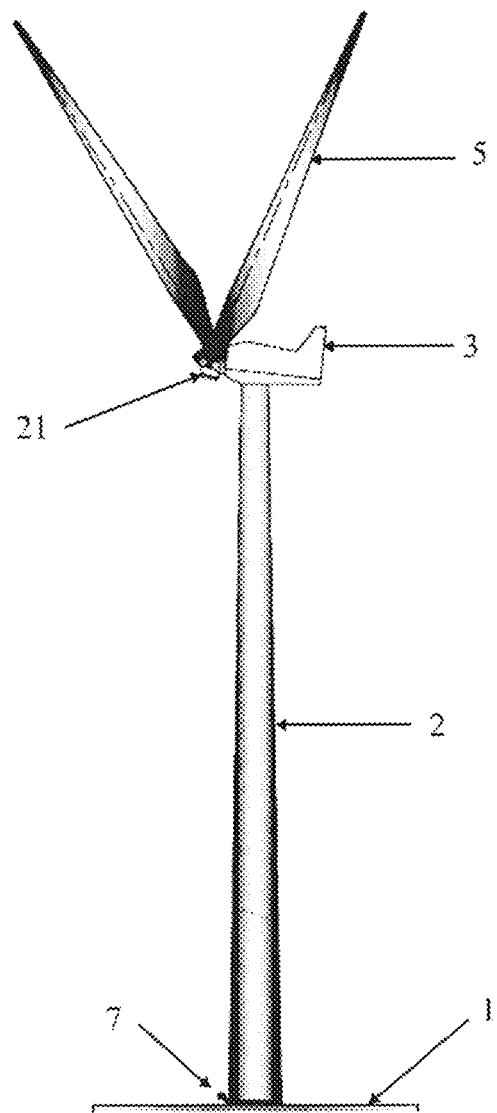
FIG. 2 illustrates a demounted blade position of a wind turbine.

FIG. 2 illustrates a demounted blade position of a wind turbine. Typically, the blade is removed from a six-o'clock (vertical hanging) position. Typically, rigging equipment 9A (as shown in FIG. 1) along with pulleys 10A (as shown in FIG. 1) is utilized for mounting and demounting of the blade of the wind turbine. As known in the art, the wind turbine includes a foundation 1, a tower 2 erected on the foundation 1, a nacelle 3 coupled with a rotor hub 4 and blades 5. The tower 2 may comprise segments of either open type or closed type which allow access to the main housing of the nacelle 3. As known in the art, the nacelle 3 provides housing for the power generating equipment connected to the rotor hub 4, such as yaw drive mechanism, beds, gear box, generators, main shafts and other devices used in the nacelle of wind turbines.

Figure 3:
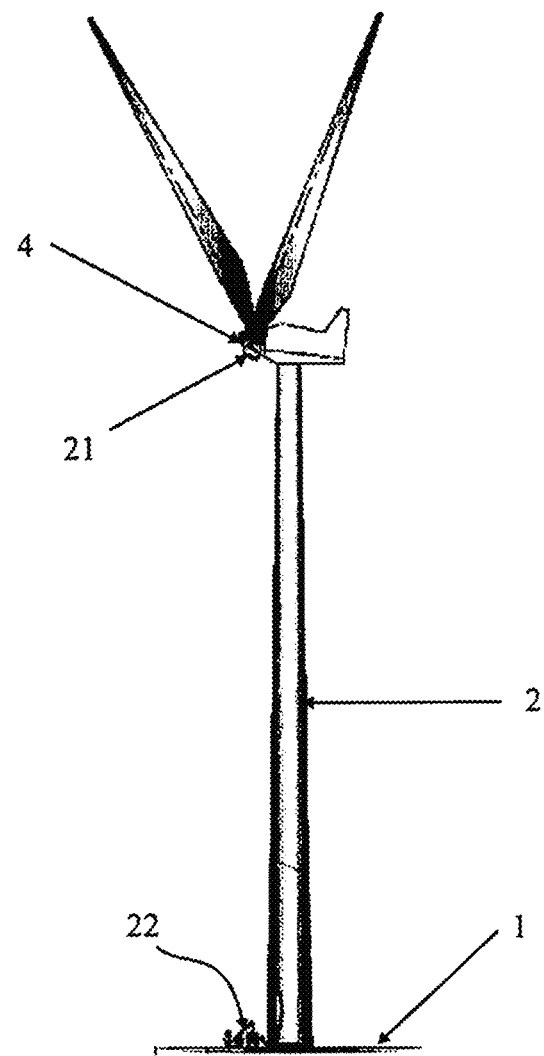
FIG. 3 illustrates a positioning of a carrier of the arrangement of FIG. 1.
Figure 4:
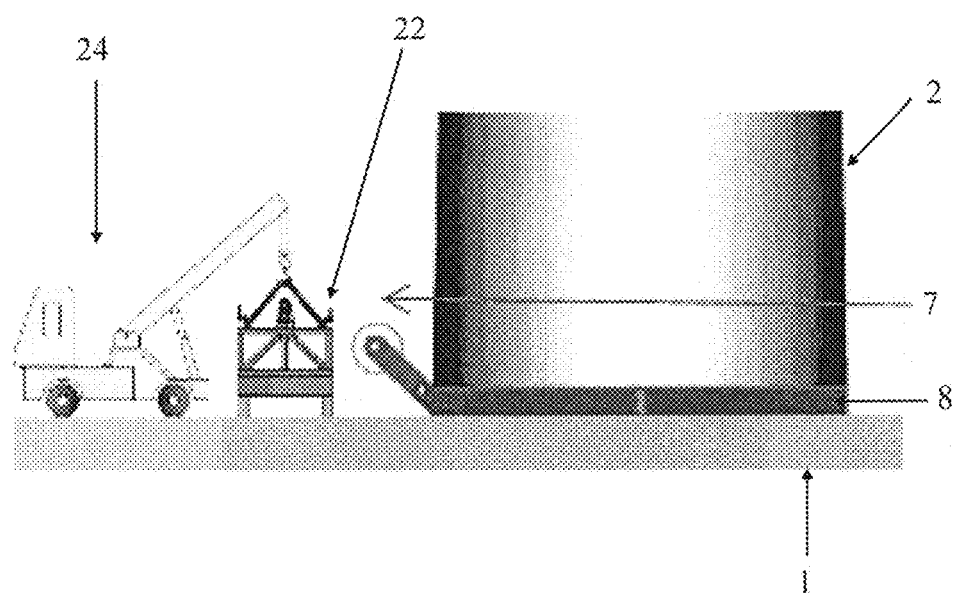
FIG. 4 illustrates an enlarged view of the carrier positioned as shown in FIG. 3.

The method and arrangement of the present disclosure utilizes the carrier to support the blade pitch slewing ring bearing during lowering and lifting operation as illustrated in FIG. 3 to FIG. 18. The lifting and lowering operation of the carrier 22 is achieved with the help of coordinated operation of the ground winch 6. The ground winch 6 adjusts the tension of the lifting line 11 to control the operation of the carrier 22. In accordance with an embodiment of the present disclosure, the carrier 22 comprises leg posts defining a closed structure for the carrier 22. Typically, four leg posts are arranged in such a manner to define a structure that is closed from all sides except from an operative top portion. Towards the operative top portion of the carrier 22, holes are provided on each of the leg posts to support a template 40, utilized to carry the blade pitch slewing ring bearing 21 of the wind turbine. The template 40 is secured to the holes on the leg posts with the help of fasteners including, but not limited to bolts, hooks, buttons, pin and the like. The template 40 has dimensions in symmetry with the blade pitch slewing ring bearing's Pitch Circle Diameter (PCD) in order to mate with the blade pitch slewing ring bearing 21 firmly to enable precise positioning and stable carrying of the blade pitch slewing ring bearing 21. Further, the carrier 22 includes a third pulley 28 that enables lifting and lowering of the carrier 22. The third pulley 28 is mounted on the operative top portion of the carrier 22. A fourth pulley 29 is mounted on the operative bottom of the carrier 22 in order to enable a stable and smooth transition of the carrier during lowering and lifting thereof. Typically, material loading equipment 24 is used to transport the carrier 22 near the tower 2 of the wind turbine. Typically, the material loading equipment 24 is a wheel mounted mobile crane. However, the material loading equipment 24 is not limited to crane and any suitable transporting means may be used to transport the carrier to the tower 2 based on the size and weight of the carrier 22. As illustrated in FIG. 3 and FIG. 4, the carrier 22 is positioned on the foundation 1 at a location in line with an operative bottom of the flange provided for the blade pitch slewing ring bearing 21 being removed from the rotor hub 4.

Figures 5, 5A:
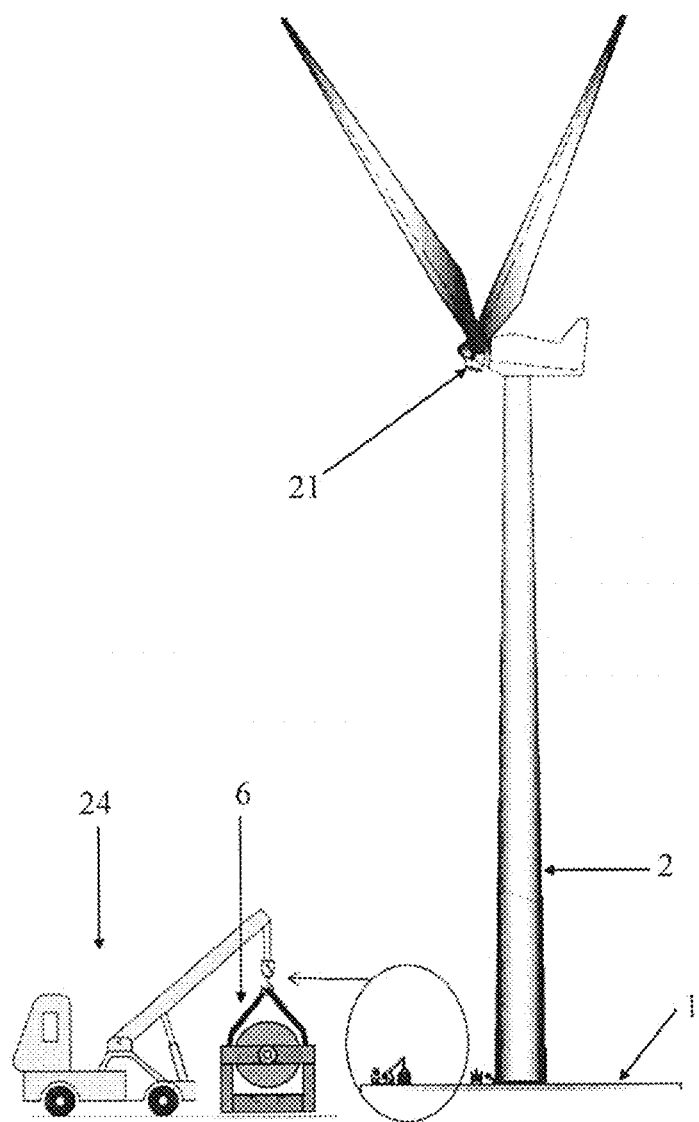
FIG. 5 illustrates the positioning of a ground winch of the arrangement of FIG. 1.
FIG. 5A illustrates an enlarged view of the ground winch positioned as shown in FIG. 5.

Referring to FIGS. 5 and 5A, a ground winch 6 is positioned on the foundation 1 at a pre-determined distance from the first pulley 7 (not specifically shown in FIG. 5-5A). The ground winch 6 is positioned with the help of the material loading equipment 24. However, any suitable transporting means based on the size and weight of the ground winch 6 may be used to position the ground winch 6. The ground winch 6 is positioned in such a manner that the carrier 22 (not shown in FIG. 5-5A), the first pulley 7 and the ground winch 6 lie in the same horizontal plane. Further, a counter weight is added at the back portion of the ground winch 6 to ensure safe and reliable operation of the ground winch 6.

Figure 6:
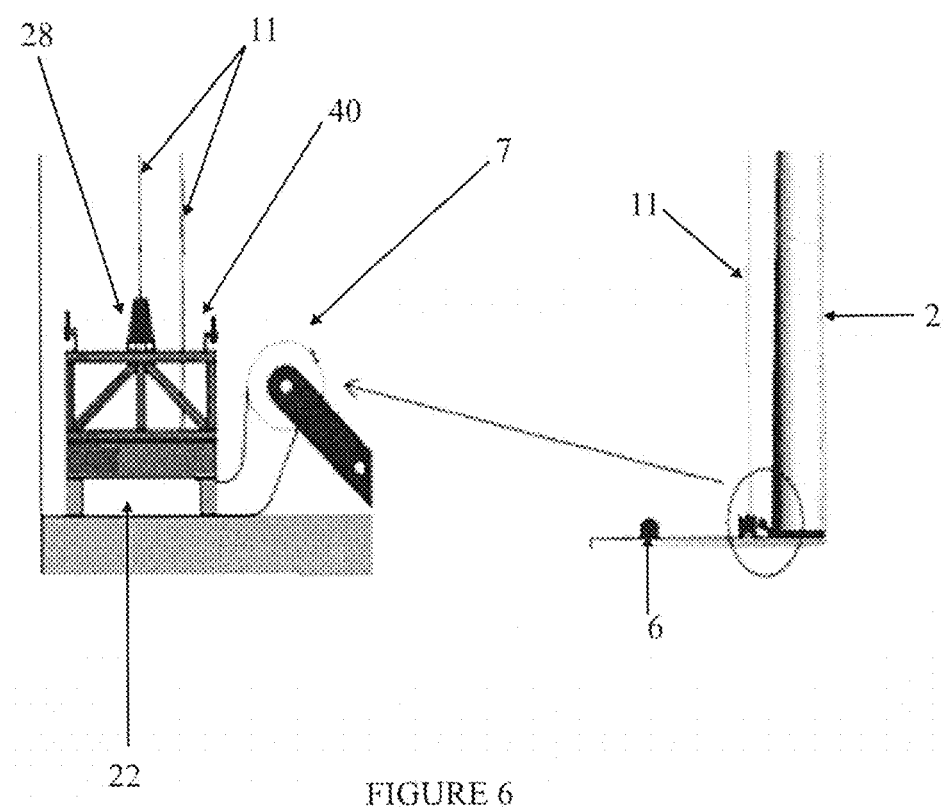
FIG. 6 illustrates the connection of a lifting line over a first pulley and a third pulley of the arrangement of FIG. 1.
Figure 7:
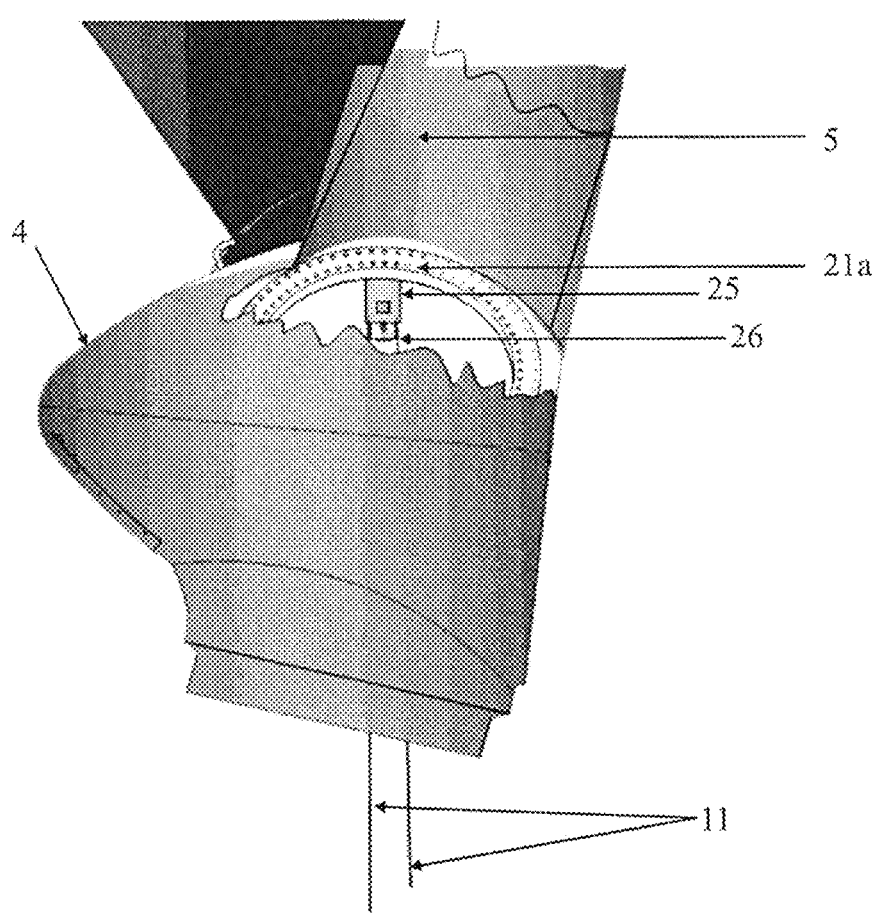
FIG. 7 illustrates a mounting of a second pulley on a second jig of the arrangement of FIG. 1.

Referring to FIG. 6, a lifting line 11 coupled with the ground winch 6 from one end is extended over the first pulley 7 from the other end. Further, the lifting line 11 is extended over a second pulley 26 positioned inside a rotor hub 4 as illustrated in FIG. 7. At least one second jig 25 is attached to one of the flanges of the blades, adjacent to the blade which is demounted. However, separate jigs may be attached to the flanges adjacent to the flange of the blade demounted from the rotor hub 4. Further, a rigging equipment (not shown in FIGURES) is attached with the second jig 25 on which the second pulley 26 is mounted at a second attachment point such that the second pulley 26 is also in line with the first pulley 7. Typically, the second pulley 26 is mounted on the rigging equipment with the help of at least one rigging components (not shown in FIGURES). The lifting line 11 is extended over the second pulley 26 and further extended over the third pulley 28 mounted on the carrier 22.

Therefore, the lifting line 11 passes over the first pulley 7 and extends over the second pulley 26 via the fourth pulley 29 mounted on the operative bottom portion of the carrier 22. Thereafter, the lifting line 11 is extended to a third pulley 28 mounted inside the carrier 22. Also, tag lines 27 are coupled to the carrier as shown in FIG. 8-FIG. 14. The tag lines 27 provide lateral support to the carrier 22 during lowering and lifting of the carrier 22. Typically, the tag lines 27 are supported by a manual force or any other suitable supporting device in order to provide excessive support thereto and to maintain moderate velocity during lowering of the carrier 22. Typically, the tag lines 27 are auxiliary ropes used by users to control load as it is being raised or lowered. The lowering and lifting of the carrier 22 is maintained by controlling and co-coordinating the movement of the ground winch 6 and simultaneously controlling the operation of tag lines 27. The use of lifting lines 11 along with the first pulley 7, the second pulley 26, the third pulley 28 and the carrier 22 reduces the need of large and heavy cranes for lifting and lowering the blade pitch slewing ring bearing 21, thereby rendering the arrangement of the present disclosure cost effective.

Figure 8:
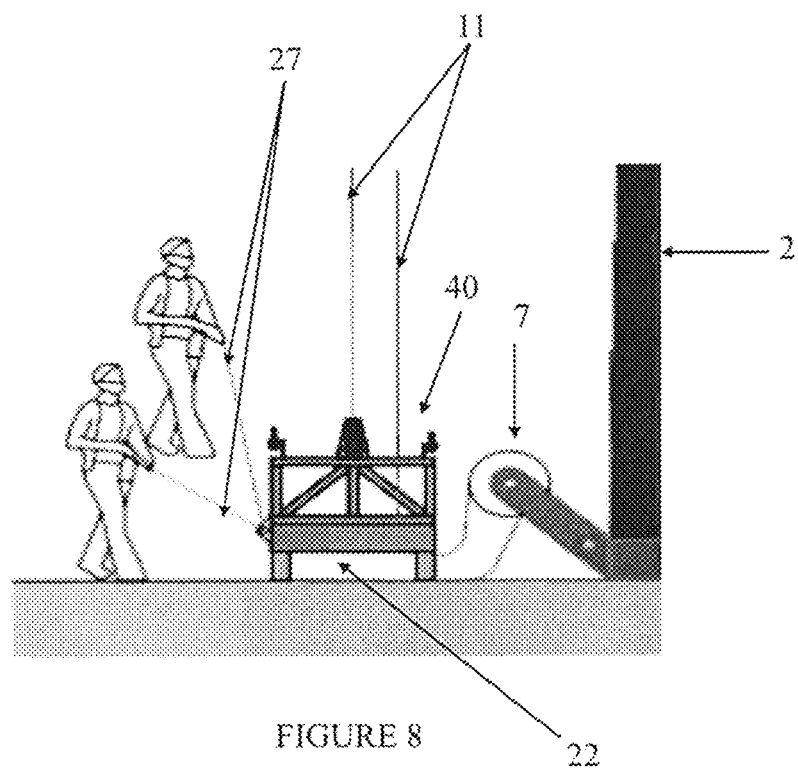
FIG. 8 illustrates the attachment of tag lines to the carrier of the arrangement of FIG. 1.
Figure 9:
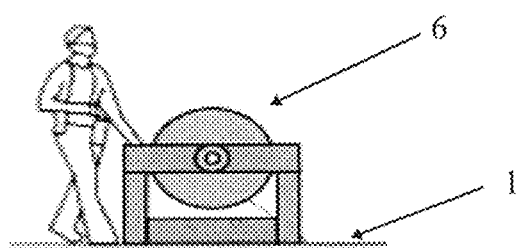
FIG. 9 illustrates a controller for controlling the operation of the ground winch of the arrangement of FIG. 1.
Figures 10, 11:
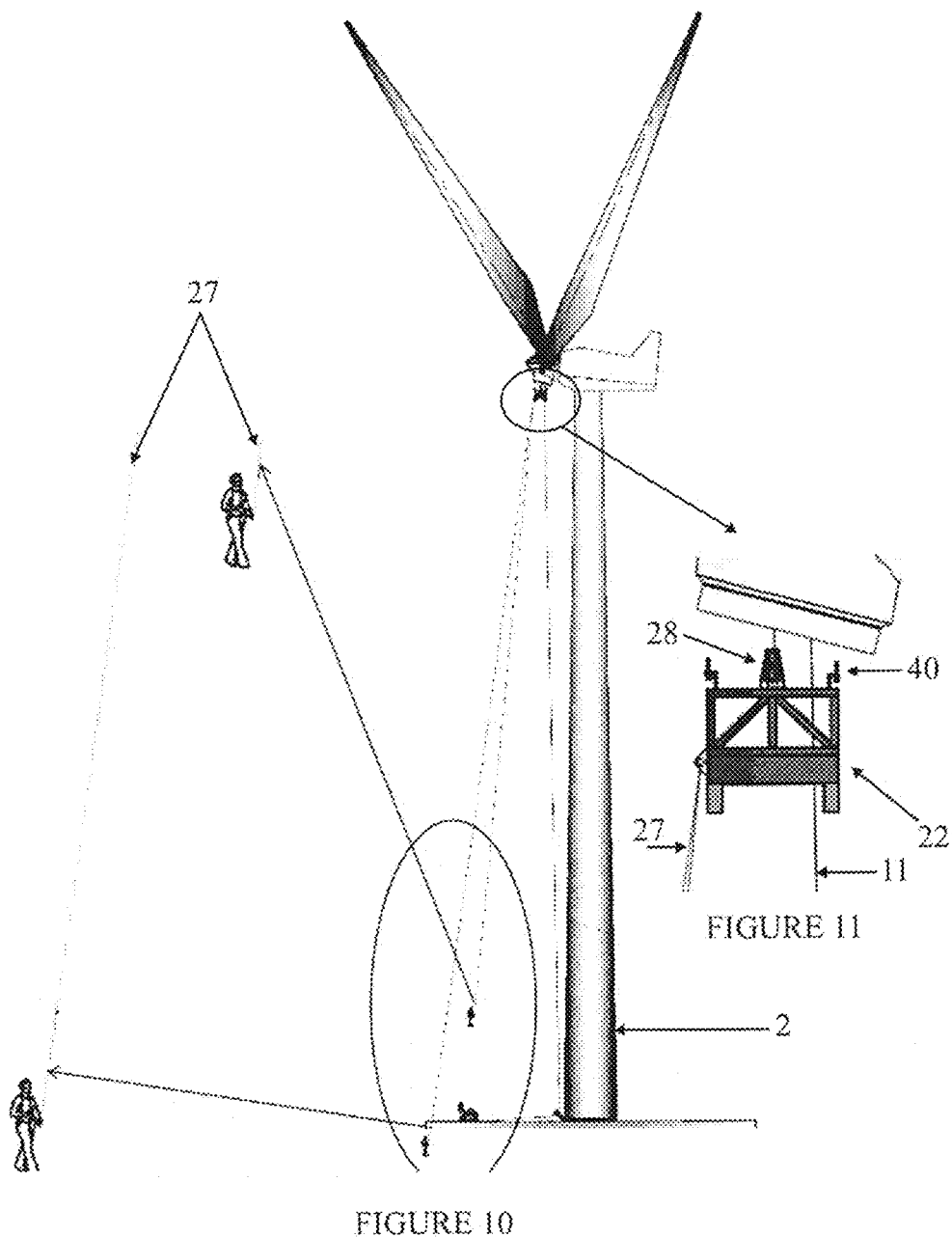
FIG. 10 illustrates the operation of the tag lines during lifting of the carrier of the arrangement of FIG. 1.
FIG. 11 illustrates an enlarged view of the positioning of the carrier of the arrangement of FIG. 1, proximate a rotor hub of the wind mill.

A controller of the ground winch 6 adjusts and controls the tension of the lifting line 11 corresponding to a control signal provided by a controller present at the rotor hub 4. By coordinating the operation of the ground winch 6 and the tag lines 27, the carrier 22 is lifted towards the rotor hub 4. Referring to FIG. 8, the carrier 22 is positioned proximate the flange of the blade demounted from the rotor hub 4 (not shown in FIG. 8) in order to enable the removal of the blade pitch slewing ring bearing 21 (not shown in FIG. 8). The template 40 is coupled to the blade pitch slewing ring bearing with the help of fasteners 42 coupling the corners of the blade pitch slewing ring bearing 21 with the template 40. The contour of the blade pitch slewing ring bearing 21 is in symmetry with the template 40. In the event the blade pitch slewing ring bearing 21 (not shown in FIG. 9) is fastened to the template 40; the bolts connecting the blade pitch slewing ring bearing 21 and the blade flange are removed. Thereafter, by coordinating the operation of the ground winch 6 and the tag lines 27, the carrier 22 is lowered to the foundation 1. The use of the carrier 22 for carrying the blade pitch slewing ring bearing 21 to the foundation 1, in order to enable replacement of the blade pitch slewing ring bearing 21, provides an ease in replacement of the blade pitch slewing ring bearing 21, thereby simplifying the removal and replacement of the blade pitch slewing ring bearing 21 as compared to conventional methods utilizing large and heavy cranes.

Referring to FIG. 7 and FIG. 12, reference numeral 21a represents the blade pitch slewing ring bearing of an adjacent blade 5. The blade pitch slewing ring bearing 21a is disposed from the rotor hub 4. The blade corresponding to the blade pitch stewing ring bearing 21, which is to be removed, is taken off prior to the commencement of the process for removing the blade pitch slewing ring bearing 21.

Referring to FIGS. 10-18, as soon as the carrier 22 is lowered down to the foundation 1, brakes of the ground winch 6 are applied and simultaneously the tag lines 27 are locked to provide stability for carrying out further operations on the blade pitch slewing ring bearing 21. Subsequently, the lifting line 11 is removed from the first pulley 7, the second pulley 26 and the third pulley 28.

Figure 18:
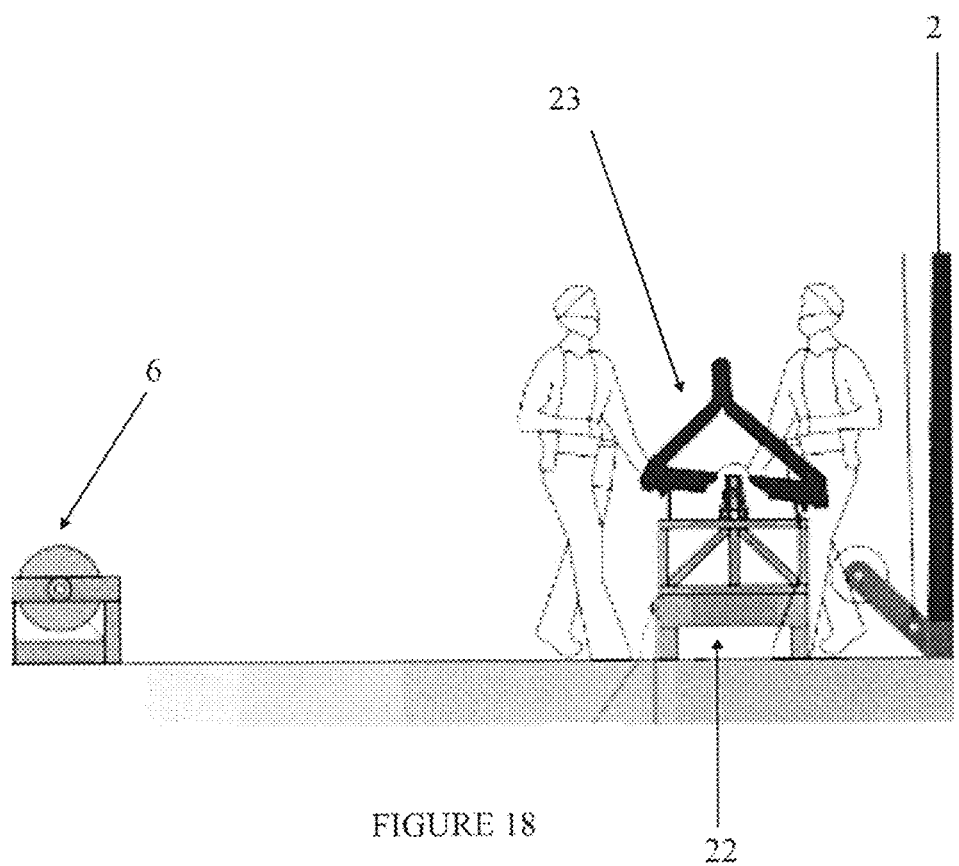
FIG. 18 illustrates an attachment of a rigging equipment to the carrier of the arrangement of the FIG. 1.
Figure 19:
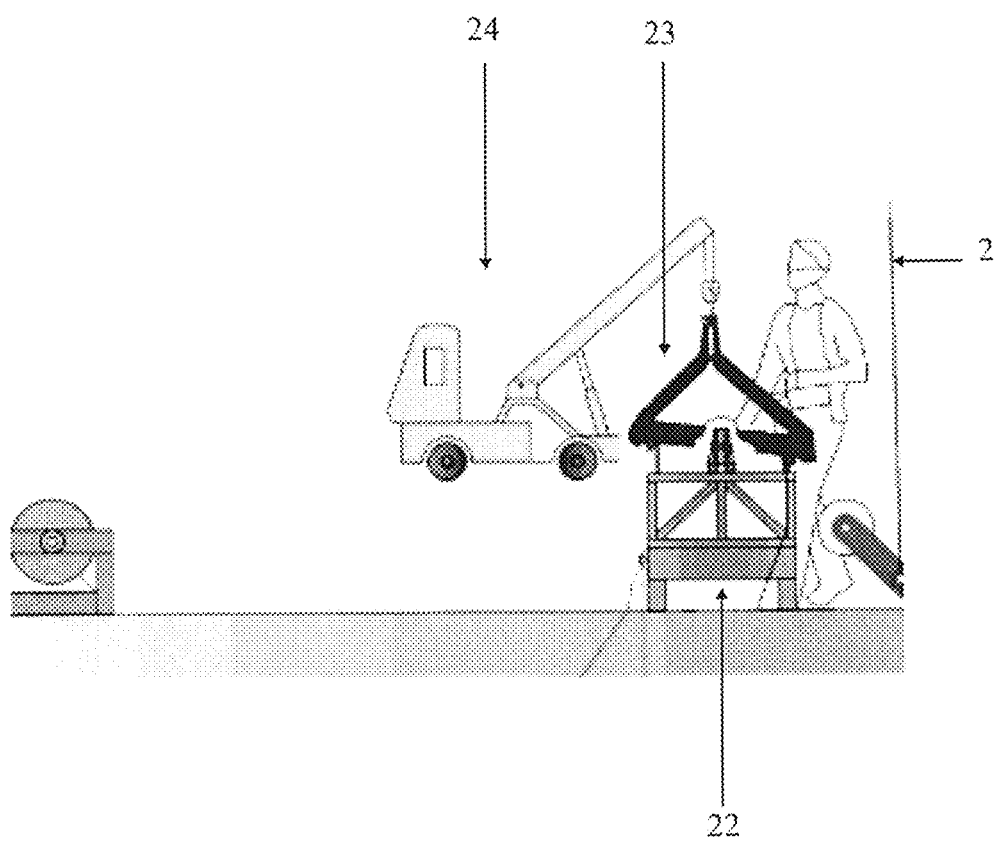
FIG. 19 illustrates the transportation of the blade pitch slewing ring bearing with the help of the rigging equipment of the FIG. 18.

As illustrated in FIG. 18 and FIG. 19, a rigging equipment 23 is attached to a hooking point of the blade pitch slewing ring bearing 21 (not shown in FIGS. 18-19) to provide easy transportation of the blade pitch slewing ring bearing 21 for repairing or any other use. Similarly, by coordinating the operation of the ground winch 6, the carrier 22 carrying the blade pitch slewing ring bearing 21 is lifted up to the rotor hub 4 (not shown in FIG. 18-19) in order to install the blade pitch slewing ring bearing 21 to the blade flange.

In one embodiment, the second pulley 26 may be fixed. The fixing of second pulley 26 may be accessed, installed or removed via openings and arrangement present in the wind turbine such as a nacelle winch or it may be a hub passage of demounted blade with the support of the carrier 22.

In another embodiment, characteristics of the ground winch 6 may vary according to use requirements and physical configurations of features of the wind turbine.

Figure 20:
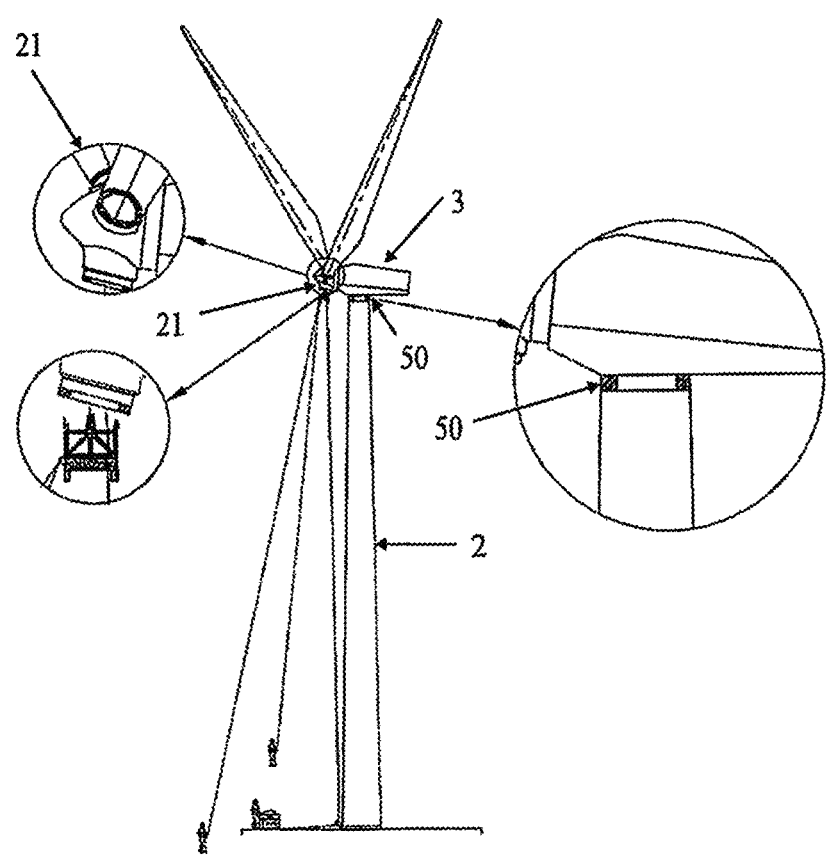
FIG. 20 illustrates a schematic view of a wind turbine depicting positions of a blade pitch slewing ring bearing and a yaw slewing ring bearing.

FIG. 20 illustrates a schematic view of the wind turbine depicting positions of the blade pitch slewing ring bearing 21 and a yaw slewing ring bearing 50. The yaw slewing ring bearing 50 has a sturdy configuration to withstand for longer life.

Although the method and the arrangement of the present invention are described with reference to the illustrated configuration, other configurations are included in the scope of the present invention.

Technical Advancements and Economic Significance

The technical advancements offered by the present invention include the realization of:
- a method for removing of a blade pitch slewing ring bearing of a wind turbine after a blade is removed from a rotor hub of the wind turbine;
- a method that is simple;
- an arrangement for lifting and removing of a blade pitch slewing ring bearing of a wind turbine when a blade from a rotor hub of the wind turbine is removed; and
- an arrangement that is cost effective.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

Wherever a range of values is specified, a value up to 10% below and above the lowest and highest numerical value respectively, of the specified range, is included in the scope of the disclosure.

The foregoing description of the specific embodiment will so fully reveal the general nature of the embodiment herein that others can, by applying current knowledge, readily modify and/or adapt for various applications such specific embodiment without departing from the generic concept, and, therefore, such adaptations and modifications should and are intended to be comprehended within the meaning and range of equivalents of the disclosed embodiment. It is to be understood that the phraseology or terminology employed herein is for the purpose of description and not of limitation. Therefore, while the embodiment herein has been described in terms of preferred embodiment, those skilled in the art will recognize that the embodiment herein can be practiced with modification within the spirit and scope of the embodiment as described herein.

We claim:

1. A method for removal and lifting of a blade pitch slewing ring bearing of a wind turbine after a blade from a rotor hub of said wind turbine is removed, said method comprising:
   positioning a first jig at a bottom of said wind turbine;
   attaching a first pulley to said first jig at a first attachment point at said bottom of said wind turbine;
   attaching a second pulley to a second attachment point at the rotor hub of said wind turbine;
   attaching a third pulley at an operative top portion of a carrier positioned in line with said second pulley;
   attaching a lifting line from a ground winch over said first pulley, said second pulley and said third pulley; and
   removing said blade pitch slewing ring bearing by an operation of said ground winch,
   wherein removing said blade pitch slewing ring bearing includes:
   positioning said carrier proximate said blade pitch slewing ring bearing of said wind turbine;
   fastening said blade pitch slewing ring bearing to a template placed on said carrier at the operative top portion of said carrier;
   removing bolts between said blade pitch slewing ring bearing and a hub flange of said wind turbine; and
   lowering said blade pitch slewing ring bearing by the operation of said ground winch.

2. The method as claimed in claim 1, wherein said step of attaching a second pulley comprising the steps of:
   positioning a second jig inside said rotor hub of said wind turbine; and
   attaching said second pulley to the at least one second jig at said second attachment point.

\* \* \* \* \*